United States Patent
Takagi et al.

(10) Patent No.: US 7,023,114 B2
(45) Date of Patent: Apr. 4, 2006

(54) VIBRATION MOTOR AND ITS BOARD MOUNTING STRUCTURE

(75) Inventors: Takahiro Takagi, Nakamaruko Maruko-Machi (JP); Yuuki Yamada, Nakamaruko Maruko-Machi (JP)

(73) Assignees: Sanyo Seimitsu Co., Ltd., Nagano-ken (JP); Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 11/073,863

(22) Filed: Mar. 8, 2005

(65) Prior Publication Data
US 2005/0206257 A1    Sep. 22, 2005

(30) Foreign Application Priority Data
Mar. 22, 2004 (JP) .............................. 2004-082381
Aug. 2, 2004 (JP) .............................. 2004-225591

(51) Int. Cl.
*H02K 7/06* (2006.01)
(52) U.S. Cl. ...................... 310/81; 310/89; 310/40 MM
(58) Field of Classification Search ......... 310/40 MM, 310/81, 89, 91; 340/7.6, 407.1
See application file for complete search history.

(56) References Cited

U.S. PATENT DOCUMENTS

| | | | | |
|---|---|---|---|---|
| 5,835,006 A | * | 11/1998 | Michalak et al. | 340/407.1 |
| 6,081,055 A | * | 6/2000 | Narusawa | 310/81 |
| 6,133,657 A | * | 10/2000 | Semenik et al. | 310/81 |
| 6,495,939 B1 | * | 12/2002 | Yamaguchi et al. | 310/81 |
| 6,563,242 B1 | * | 5/2003 | Ibata et al. | 310/90 |
| 6,714,123 B1 | * | 3/2004 | Miyake et al. | 340/407.1 |
| 2002/0167237 A1 | * | 11/2002 | Horng et al. | 310/81 |
| 2005/0073205 A1 | * | 4/2005 | Takagi et al. | 310/89 |

* cited by examiner

*Primary Examiner*—Thanh Lam
(74) *Attorney, Agent, or Firm*—Armstrong, Kratz, Quintos, Hanson & Brooks, LLP

(57) ABSTRACT

A vibration motor comprised of a motor body, a motor shaft projecting from the motor body, an eccentric weight attached to the motor shaft, and a mounting frame for setting the motor body on one surface of a board, wherein the mounting frame has a pair of feet straddling a motor case in its thickness direction and extending in parallel with the motor shaft and wherein a plane including the back surfaces of the pair of feet intersects with a circular orbit of the outermost point of the eccentric weight at two points, thereby enabling the vibration motor to be mounted on a thinner board, and a board mounting structure of the same.

18 Claims, 15 Drawing Sheets

FIG.1
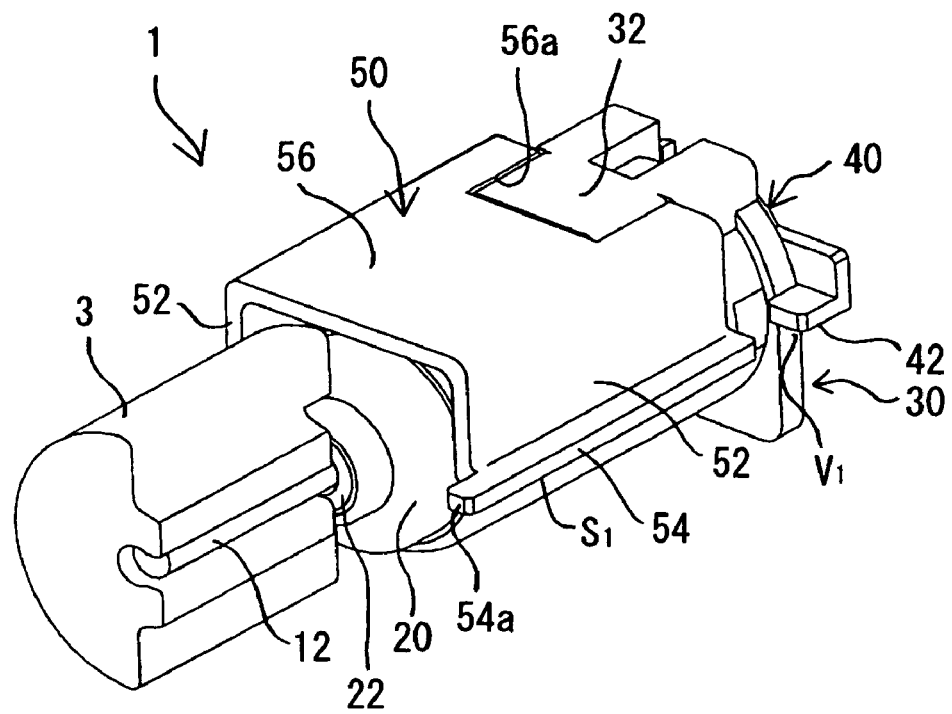
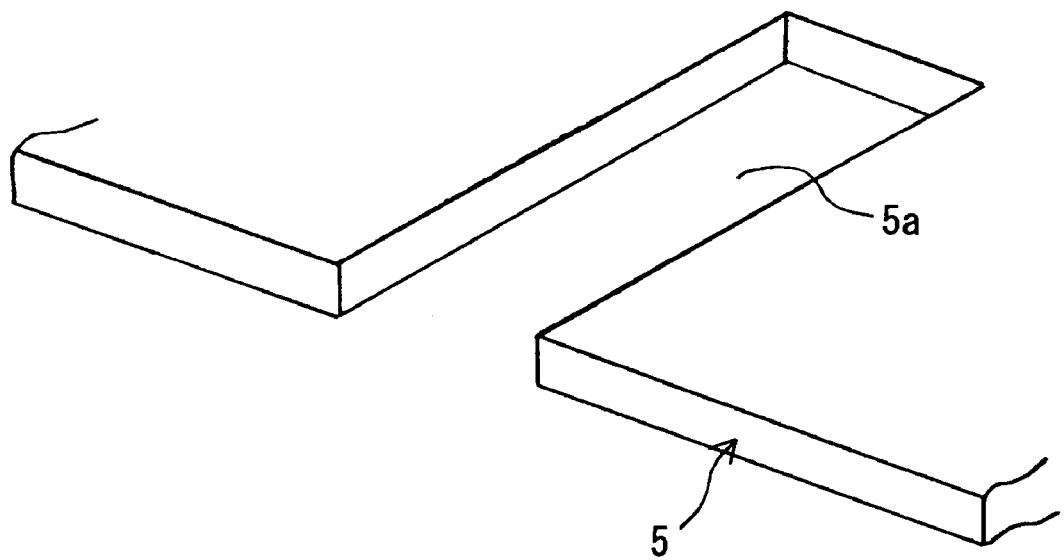

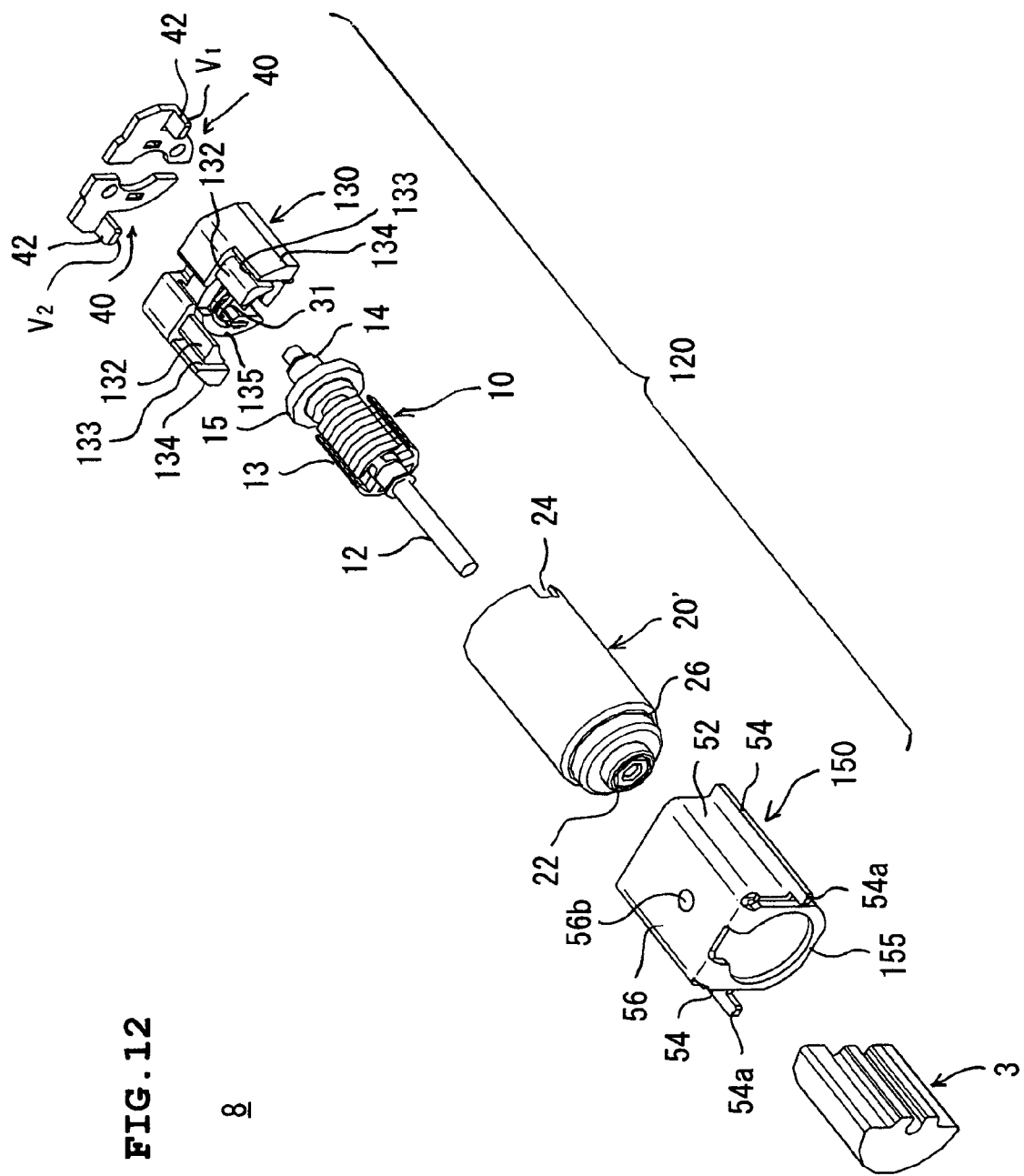

VIBRATION MOTOR AND ITS BOARD MOUNTING STRUCTURE

BACKGROUND OF THE INVENTION

1. Field of the Invention

The present invention relates to a vibration motor, more particularly relates to a vibration motor of a structure suitable for mounting on a printed circuit board etc.

2. Description of the Related Art

In the past, as a vibration motor of a structure suitable for surface mounting on a printed circuit board, as disclosed in Japanese Patent Publication (A) No. 11-234943, there has been known one having a motor body with an eccentric weight attached to a motor shaft, a metal holder frame provided with a motor holding part for fitting inside it and holding that motor case, and a pair of external connection terminal pieces (motor terminals) attached to a plastic end cap for closing an opening of the motor case at the side opposite to the eccentric weight, wherein the flat back surfaces of the metal holder frame and a pair of external connection terminal pieces are surface mounted by bringing them into contact, through coating cream solder, with bonding patterns and power feed patterns formed on the printed circuit board and by reflow soldering.

The many electrical components mounted on printed circuit boards in mobile phones and other thin devices are being made increasing thinner and smaller. Vibration motors, however, have rotating eccentric weights. In order to secure a predetermined vibration force, it is physically impossible to shorten the distance from the center of rotation to the outermost point of the eccentric weight. The specific gravity of the tungsten or other heavy metal forming the eccentric weight is also limited. Rather, to obtain a stronger vibration force than the present, the eccentric weights are expected to become larger. As opposed to this, if trying to reduce the area occupied on the board, since the motor body is set on the board surface in a horizontal prone posture, even if increasing the axial length or increasing the girth, assuming the same motor performance, the effect of reduction of the occupied area is not improved that much. There is an increasingly stronger trend toward a tradeoff between the increased size of the eccentric weight and the smaller size of the motor body.

SUMMARY OF THE INVENTION

An object of the present invention is to provide a vibration motor enabling the mounting board to be made thinner and a board mounting structure of the same.

Another object of the present invention is to provide a vibration motor enabling the area occupied on the board to be reduced and a board mounting structure of the same.

According to a first aspect of the present invention, there is provided a vibration motor comprised of a motor body, a motor shaft projecting from the motor body, an eccentric weight attached to the motor shaft, and an attaching means for supporting the motor body in a horizontal prone posture at one surface of a board, wherein the attaching means has a pair of attachment faces straddling the motor shaft and extending in parallel with the same at the two sides of a motor case and a plane including the pair of attachment faces intersects with a circular orbit of the outermost point of the eccentric weight at two points.

Preferably, parts of the pair of attachment faces are positioned closer to the eccentric weight side than a center of gravity of the vibration motor itself.

More preferably, the motor body has an engaging means elastically fitting into a cutaway space or open space of the board.

Preferably, a distance between a center point of a line connecting the two points and a point where a diametrical line of the circular orbit passing through that center point intersects the circular orbit in a normal direction at a plane including the pair of attachment faces is at least the radius of the circular orbit and not more than the sum of the radius and the thickness of the board.

Preferably, a pair of external connection terminals attached to the side of the motor body opposite to the eccentric weight side have supplementary attachment faces substantially in the same plane as the plane including the pair of attachment faces and in contact with one surface of the board.

Preferably, the motor body has an end cap for closing an opening of the motor case at the side opposite to the eccentric weight and a pair of external connection terminal pieces attached to the end cap, the attaching means has a pair of legs straddling the motor case in its thickness direction, a leg connecting part connecting the pair of legs on the motor case, and feet formed at the bottom of the legs, and the attachment faces are the back surfaces of the feet.

More preferably, the feet are formed by bending the bottom ends of the legs outward.

More preferably, the leg connecting part has a recess with which a male part formed at the end cap fits in a sliding direction, and the end cap is formed with a positioning spacer to be inserted filling the space from the back surface of the leg connecting part to the circumferential surface of the motor case.

Still more preferably, said leg connecting part and the circumference of said motor case are welded together at least in part.

Still more preferably, said attaching means is bent from the eccentric weight side of said leg connecting part and formed integrally with a collar part to be fit around a neck part of said motor case.

Still more preferably, a recess of said motor case and an engagement part of said end cap are fit together in the state with said end cap press-fit into an opening side of said motor case.

Still more preferably, said engagement part is formed interposed between the outer circumference of said motor case and one of external connection terminals.

Still more preferably, said end cap has an insulating part interposed between the outer circumference of said motor case and the other external connection terminal in the state with said end cap press-fit into the opening side of said motor case.

Still more preferably, positioning spacers of said end cap is inserted to the space between the outer circumference of said motor case and inner corner parts of said attaching means in the state with said end cap press-fit into the opening side of said motor case.

Still more preferably, pressing parts of said end cap are inserted along outside bending lines between said legs and said feet of said attaching means in the state with said end cap press-fit into the opening side of said motor case.

More preferably, the feet are formed with projections projecting further to the eccentric weight side than the position of the center of gravity of the vibration motor itself.

More preferably, the legs are formed with engaging projections elastically pressing against the side surfaces of the cutaway space or open space of the board.

According to a second aspect of the invention, there is provided a board mounting structure of a vibration motor comprised of any of the above vibration motors and a board provided with a cutaway space or an open space, wherein a pair of attachment faces of the vibration motor is affixed to one surface of the board at the sides of the cutaway space or the open space, and the vibration motor is mounted with at least the motor body in a state sunken in the cutaway space or the open space.

BRIEF DESCRIPTION OF THE DRAWINGS

These and other objects and features of the present invention will become clearer from the following description of the preferred embodiments given with reference to the attached drawings, wherein:

FIG. 1 is a perspective view of a vibration motor according to a first embodiment of the present invention and a board for mounting the same;

FIG. 3A is a perspective view of the state of the vibration motor mounted on a board as seen from the eccentric weight side, while

FIG. 4A is a front view of the vibration motor, while

FIG. 5A is a right side view of the vibration motor, while

FIG. 6A is a plane view of the vibration motor, while

FIG. 12 is an assembled perspective view of the vibration motor;

FIG. 13A is a perspective view of the state of mounting of the vibration motor on a board as seen from the eccentric weight side, while

DESCRIPTION OF THE PREFERRED EMBODIMENTS

Preferred embodiments of the present invention will be described in detail below while referring to the attached figures.

Figure 7:
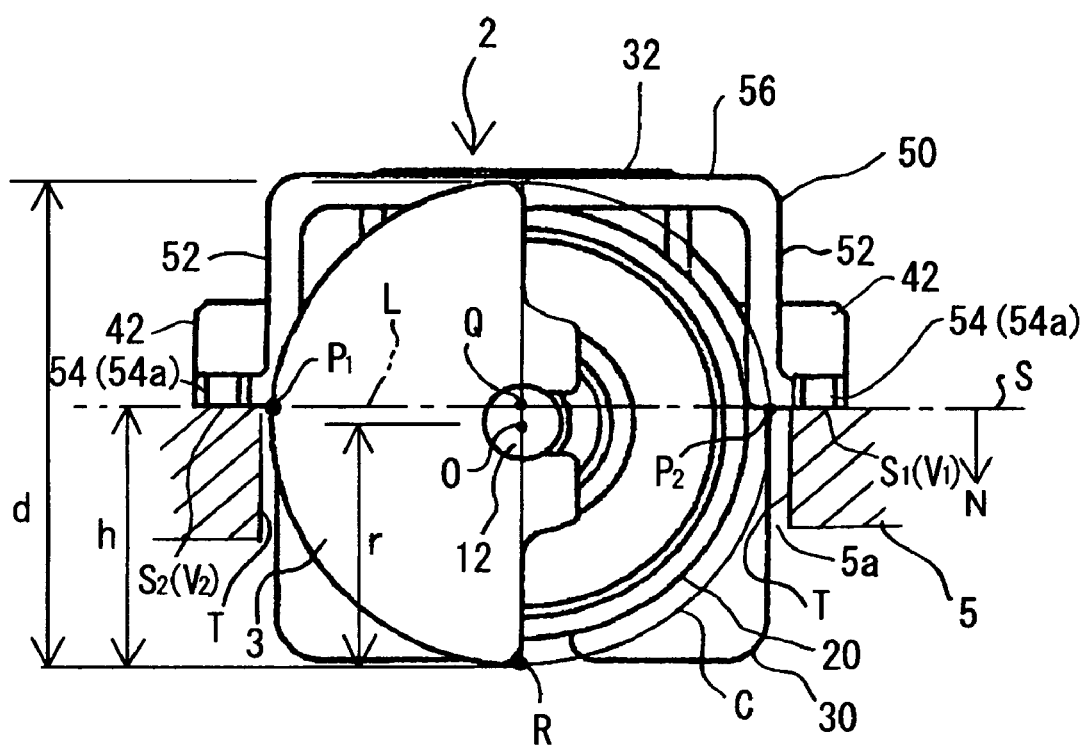
FIG. 7 is an explanatory view of the positional relationship between the installation surface and the eccentric weight in the vibration motor.

The vibration motor 1 of the present invention has a motor body 2, a motor shaft 12 projecting from the motor body 1, an eccentric weight 3 attached to the motor shaft 12, and an attaching frame 50 for supporting the motor body in a horizontal prone posture at one surface of a board 5. The attaching frame 50 has a pair of attachment faces straddling the motor shaft 12 and extending in parallel with the same at the two sides of a motor case 20. As shown in FIG. 7, a plane S including the pair of attachment faces $S_1$ and $S_2$ intersects with a circular orbit C of the outermost point of the eccentric weight 3 at two points $P_1$ and $P_2$.

When mounting such a vibration motor 1 on a board, a board 5 provided with a cutaway space 5a or an open space is used. That is, the vibration motor 1 is mounted so that a pair of attachment faces $S_1$ and $S_2$ are fixed to one surface of the board 5 at the two sides of the cutaway space 5a or open space and at least the motor body 2 is in a state sunken in the cutaway space 5a or open space. The eccentric weight 3 is positioned at the outside from one edge of the board 5 or in the open space 5a. In the past, to prevent the circular orbit of the eccentric weight from intersecting with the board surface, it was necessary to arrange the flat back surface of the metal holder and other attachment faces outside of the circular orbit, but as shown in FIG. 7, in the present invention, since the plane S including the pair of attachment faces $S_1$ and $S_2$ intersects the circular orbit C of the outermost point of the eccentric weight 3 at two points $P_1$ and $P_2$, it is possible to mount the vibration motor on the board 5 with at least the motor body sunken into the cutaway space 5a or open space. Therefore, the vibration motor 1 is mounted not on one surface of the board 5, but using the thickness parts of the board 5. Accordingly, it is possible to reduce the height of the vibration motor 1 sticking out from one surface of the board 5 and obtain a thinner mounting board 5. In the case of two surface mounting, the effect of reduction of the thickness is further enhanced.

Further, when using the open space, it is necessary to make the eccentric weight 3 sink into the open space, so the mounting board 5 can be made thinner, but the area occupied on the board 5 is not reduced. When utilizing the cutaway space 5a, the eccentric weight 3 can be arranged utilizing the space outside one side edge of the board 5 (clearance between board side edge and board case etc.), so the actual area occupied on the board 5 can be reduced. Further, the eccentric weight 3 can be made larger.

Here, preferably, parts of the pair of attachment faces $S_1$ and $S_2$ are positioned closer to the side of the eccentric weight 3 than a center of gravity of the vibration motor 1 itself. Even if the eccentric weight 3 is heavy, the problem of the vibration motor 1 falling over to its eccentric weight 3 side at the time of placing the vibration motor 1 on the board 5 can be prevented.

However, no parts of the attachment faces $S_1$ and $S_2$ can be positioned at the circular orbit C of the eccentric weight 3, so as a means for preventing falling over, more preferably, the motor body 2 has engaging means elastically fitting into the cutaway space 5a or open space of the board 5. Due to the engaging means, a gripping action operates inside the cutaway space 5a or open space and the problem of the vibration motor 1 falling over can be reliably prevented.

Further, as shown in FIG. 7 for example when making the distance h between a center point Q of a line L connecting the two points $P_1$ and $P_2$ and a point R where a diametrical line d of the circular orbit C passing through that center point Q intersects the circular orbit C in a normal direction N at a plane S including the pair of attachment faces $S_1$ and $S_2$ is at least the radius r of the circular orbit C and not more than the sum of the radius r and the thickness of the board 5, the center O of rotation is substantially in the thickness of the board 5, so the amount of the motor sticking out to the two sides can be made equal and the thickness can be reduced to the minimum.

For example, when surface mounting by reflow soldering, if the bonding force of the attachment faces and the bonding patterns on the board is weak, positional deviation is liable to occur in the middle of transport of the board to the furnace etc. To prevent this, when the pair of external connection terminals attached to the side of the motor body opposite to the eccentric weight side have supplementary attachment faces $V_1$ and $V_2$ substantially in the same plane as the plane S including the pair of attachment faces and in contact with one surface of the board, positional deviation can be prevented even when bonding force is applied to the power feed patterns at the side of the motor body opposite to the eccentric weight 3.

As the attaching means, it is also possible to use projections formed by cutting into and bending outward parts of the circumferential surface of the motor case 20 or plug-in members plugged into holes formed in the circumferential surface of the motor case 20. In the former case, no increase in the number of parts is caused, but the holes caused have to be plugged up. In the latter case, the number of parts increases by two or more and the plug-in members have to be fixed at the thickness parts of the motor case 20.

Therefore, preferably the motor body 2 has an end cap for closing an opening of the motor case 20 at the side opposite to the eccentric weight 3 and a pair of external connection terminal pieces attached to the end cap. The attaching means has a pair of legs straddling the motor case in its thickness direction, a leg connecting part connecting the pair of legs on the motor case, and feet formed at the bottom of the legs. The attachment faces $S_1$ and $S_2$ are the back surfaces of the feet. The attaching means is a single part attached utilizing the end cap, so does not require any special fastener etc. When the feet are formed by bending the bottom ends of the legs inward, the distance h can only be set from 0 to the value of the radius r, but the feet fit in the area occupied by the motor case 20, so the area occupied on the board 5 is not increased. When the feet are formed by bending the bottom ends of the legs outward, the area occupied on the board increases by exactly the amount of the feet, but the distance h can be set freely from the value of the radius r to the diameter d.

As the structure for affixing the attaching means to the end cap, more preferably, the leg connecting part 56 has a recess with which a male part formed at the end cap fits in a sliding direction, and the end cap is formed with a positioning spacer for insertion in the space from the back surface of the leg connecting part 56 to the circumferential surface of the motor case 20. Due to this positioning spacer, the motor shaft 12 and legs 54 can be set at a high degree of parallelism and interference between the eccentric weight 3 and board 5 can be prevented. When the top surface of the leg connecting part 56 is a flat surface, it is possible to pick up the leg connecting part 56 by a suction pad, so a mechanical mounting operation becomes possible.

When positioning spacers of the end cap 30 are inserted to the space between the outer circumference of the motor case 20 and inner corner parts of the attaching means in the state with the end cap press-fit into the opening side of the motor case 20, since the positioning spacers are inserted into the inner corner parts as dead spacers, the attaching means need not be high, so it is possible to bond the leg connecting part 56 and the circumference of the motor case 20 at least at part. However, when a mobile phone etc. housing the vibration motor is dropped and a shock is given to the vibration motor, since the eccentric weight 3 is considerably heavy, impact stress is liable to occur at the spot welds resulting in easy breakage and therefore the vibration motor is liable to detach from the attaching means.

Therefore, the attaching means is preferably bent from the eccentric weight 3 side of the leg connecting part 56 and formed integrally with a collar part to be fit around a neck part of the motor case 20. Since the neck part of the motor case 20 is fit with a collar-like part and supported by the attaching means, impact stress will not concentrate at the spot welds, there will be resistance to breakage, and the impact resistance of the vibration motor 1 will be greatly improved. Of course, it is also possible to provide the collar-like part even if there are no spot welds.

When the recess of the motor case 20 and an engagement part of the end cap are fit together in the state with the end cap press-fit into an opening side of the motor case 20, the end cap can be stopped from rotating. Further, when an engagement part is formed interposed between the outer circumference of said motor case and one of external connection terminals, poor insulation of the motor case 20 and external connection terminal can be prevented.

Further, when the end cap 30 has an insulating part interposed between the outer circumference of the motor case 20 and the other external connection terminal in the state with the end cap press-fit into the opening side of the motor case 20, it is possible to prevent poor insulation between the motor case 20 and external connection terminal.

When pressing parts of the end cap 30 are inserted along outside bending lines between the legs and the feet of the attaching means in the state with the end cap press-fit into the opening side of the motor case, the positioning spacers and pressing parts grip the attaching means, and motor case 20 can be positioned, so the attachment becomes tougher.

When the feet are formed with projections projecting further to the eccentric weight side than the position of the center of gravity of the vibration motor itself, the projecting pieces have a gripping action, so even if the eccentric weight 3 is heavy, the vibration motor 1 can be prevented from falling over at the time of placement on the board 5. Further, when the legs have engaging projections elastically pressing against the thickness faces of the cutaway space or open space of the board 5, if placing the pair of attachment faces at one surface of the board 5 at the sides of the cutaway space or the open space, the engaging projections will enter into the cutaway space or open space and elastically press against the thickness faces, so a gripping action will operate and the vibration motor can be prevented from falling over. Of course, positional deviation at the time of transport of the mounting board etc. can be prevented. Further, the installation area can be reduced, so the amount of cream solder used can also be reduced.

The present invention enables the mounting board 5 to be made thinner and the area occupied on the board 5 to be reduced when using a board 5 provided with a cutaway space. Further, if using a board 5 provided with an opening, the mounting board 5 can be made further thinner.

Next, specific embodiments of the present invention will be described with reference to the attached drawings.

First Embodiment

Figure 2:
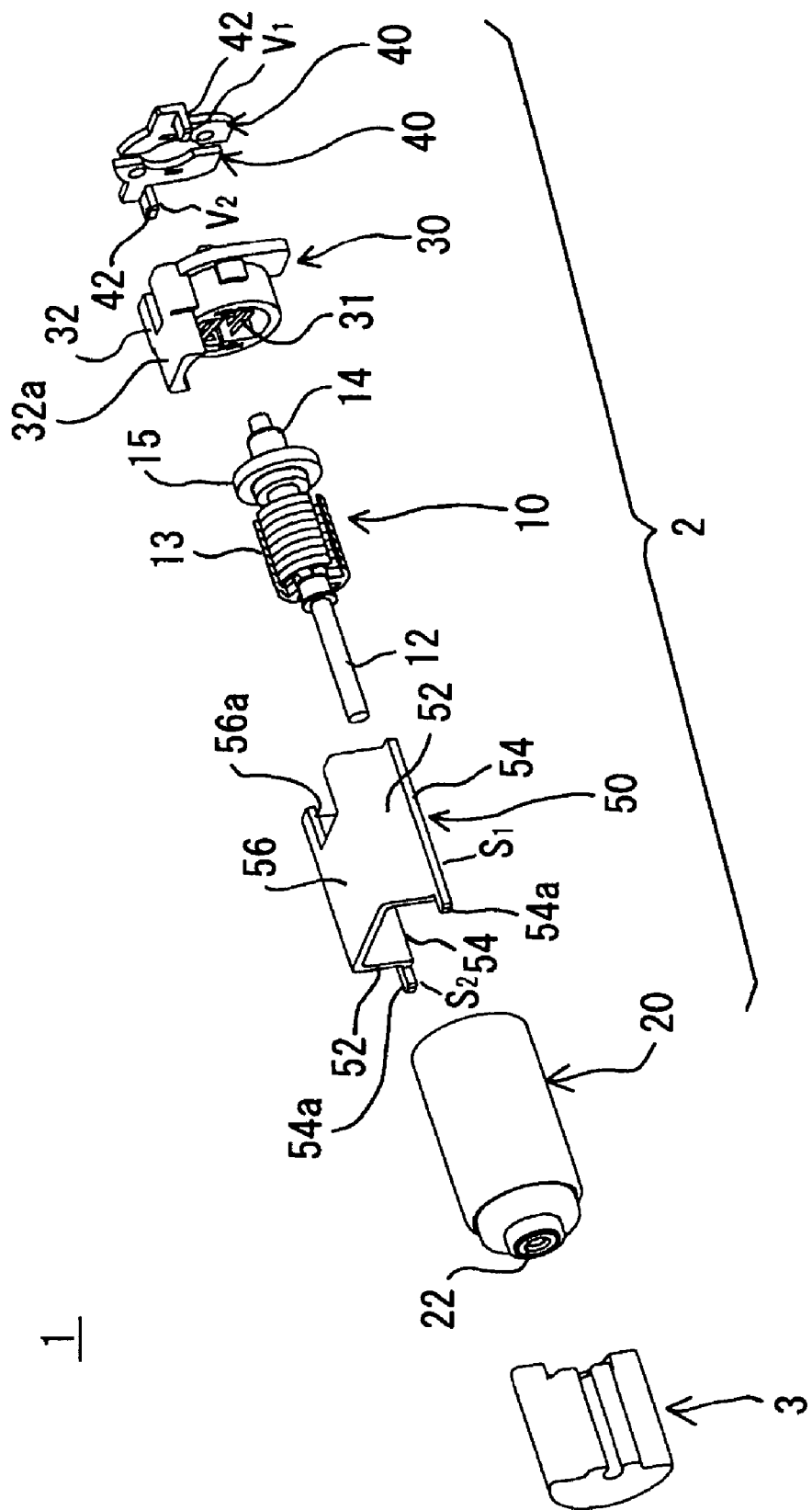
FIG. 2 is an exploded perspective view of the vibration motor.
Figure 3A:
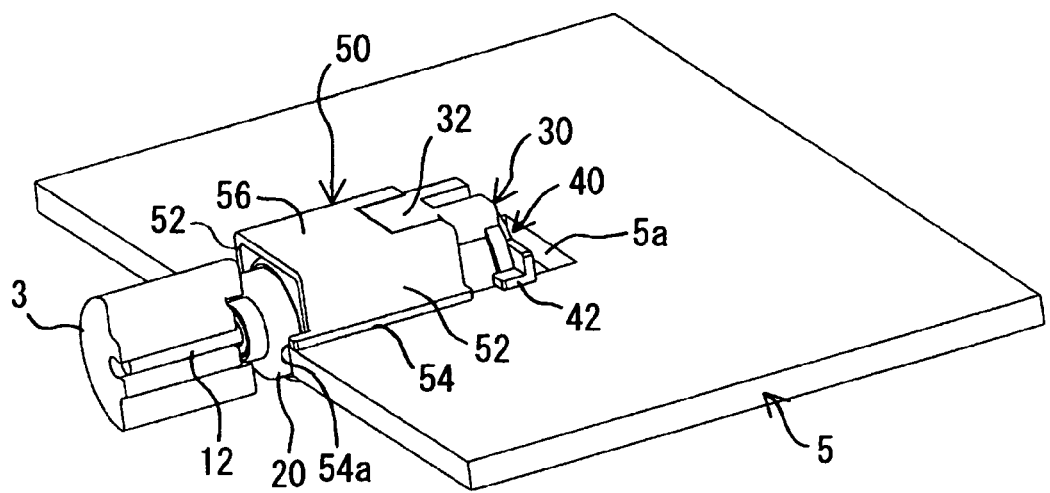
Figure 3B:
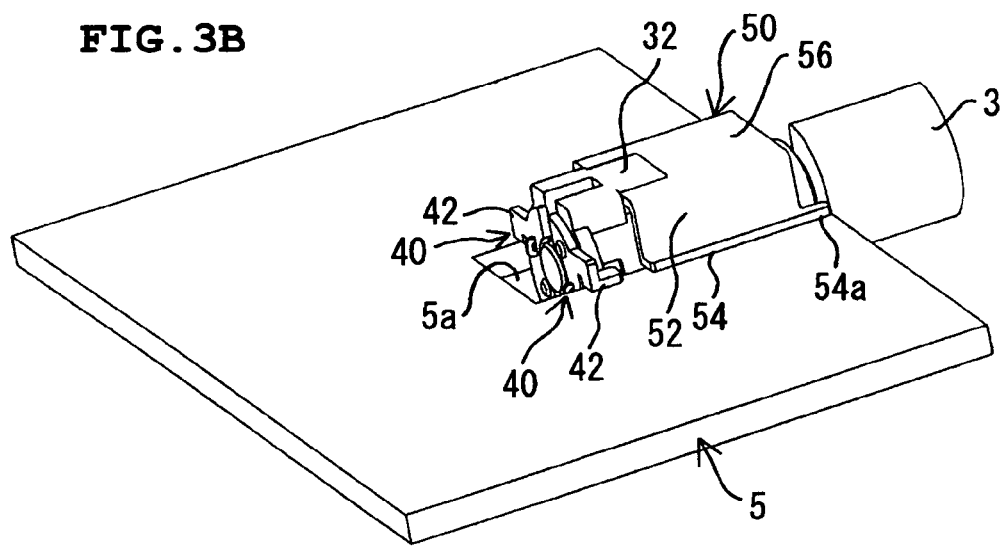
FIG. 3B is a perspective view of the state of the vibration motor mounted on a board as seen from the side opposite to the eccentric weight.
Figure 4A:
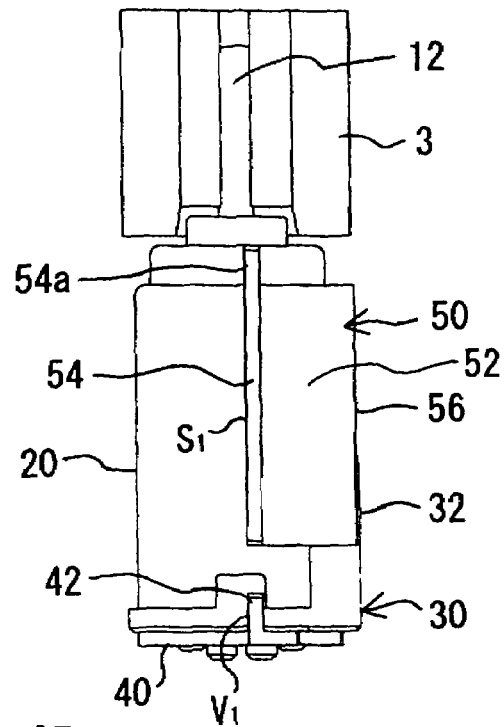
Figure 4B:
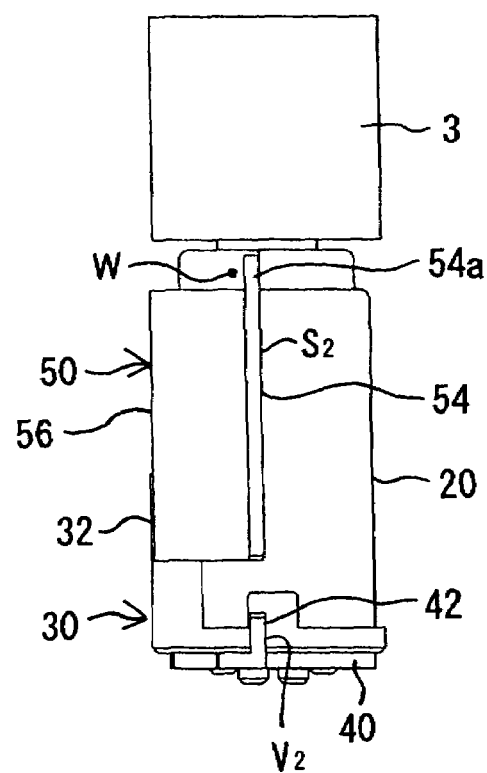
FIG. 4B is a back view of the vibration motor.
Figure 5A:
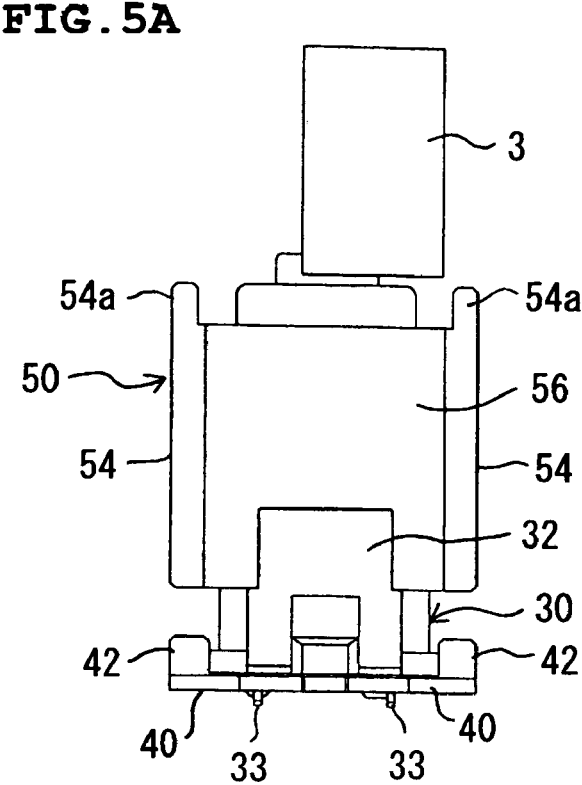
Figure 5B:
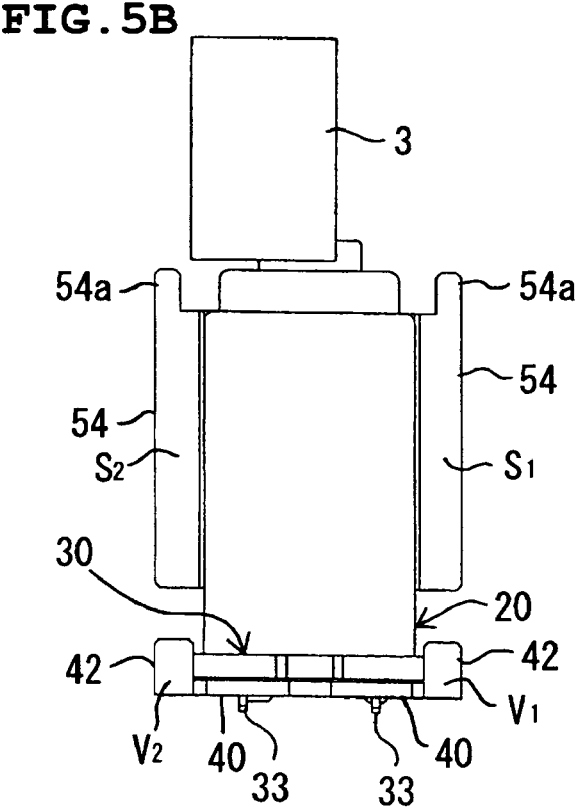
FIG. 5B is a left side view of the vibration motor.
Figure 6A:
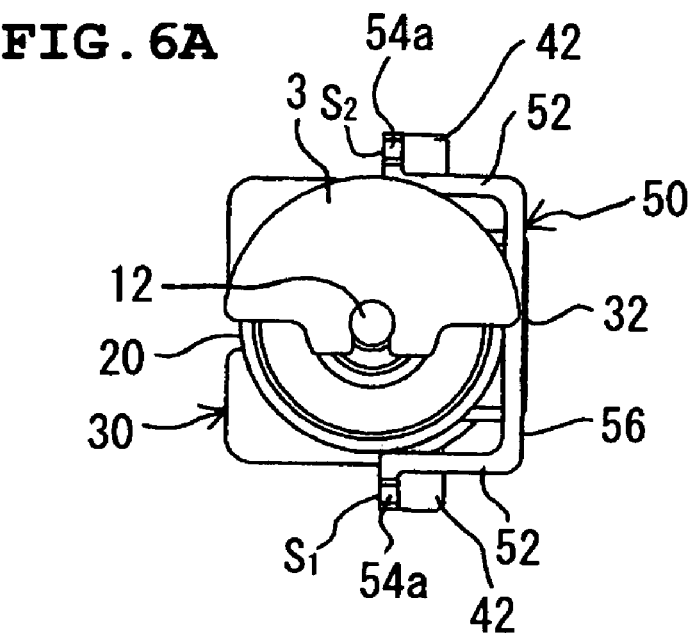
Figure 6B:
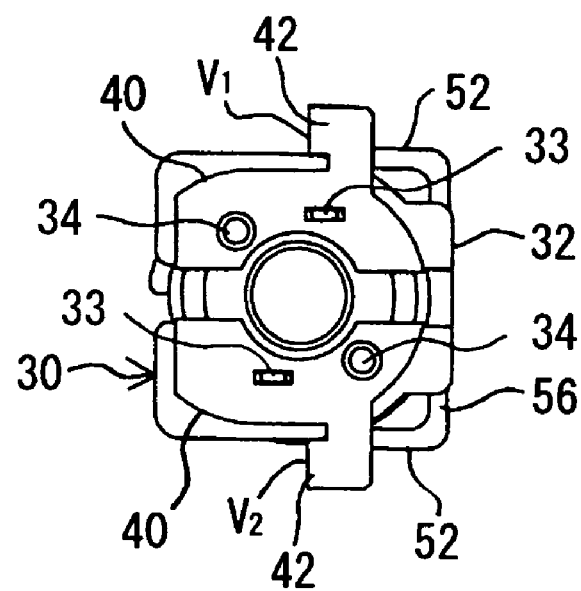
FIG. 6B is a bottom view of the vibration motor.

FIG. 1 is a perspective view of a vibration motor according to a first embodiment of the present invention and a board for mounting the same; FIG. 2 is an exploded perspective view of the vibration motor; FIG. 3A is a perspective view of the state of the vibration motor mounted on a board as seen from the eccentric weight side, while FIG. 3B is a perspective view of the state of the vibration motor mounted on a board as seen from the side opposite to the eccentric weight; FIG. 4A is a front view of the vibration motor, while FIG. 4B is a back view of the vibration motor; FIG. 5A is a right side view of the vibration motor, while FIG. 5B is a left side view of the vibration motor; FIG. 6A is a plane view of the vibration motor, while FIG. 6B is a bottom view of the vibration motor; and FIG. 7 is an explanatory view of the positional relationship between the installation surface and the eccentric weight in the vibration motor.

The vibration motor 1 of this embodiment is comprised of a motor body 2 and an eccentric weight 3 attached to a motor shaft 12 projecting out from the body. The motor body 2 is comprised of a rotor 10 (shown by a cutaway view in FIG. 2) in which an armature 13, a commutator 14, and a ring-shaped varistor 15 are fit, a cylindrical cup-shaped iron motor case 20 having a bearing (metal) 22 able to rotatably support the motor shaft 12 at its end, an end cap (brush cover) 30 made of plastic for supporting a pair of brushes 31 with open angles 180° inside and closing the opening of the motor case 20, a pair of external connection terminals (motor terminals) 40 attached to the end face of the end cap 30 and connecting with the pair of brushes 31, and an attachment frame 50 for positioning the vibration motor 1 itself in a horizontal prone posture at the board surface.

The attachment frame 50 is symmetric left-right in cross-section, is provided with a pair of legs 52 straddling the motor case 20 in its thickness direction, and is attached to the end cap 30. The bottom ends of the legs 52 are bent outward to form a pair of feet 54 which straddle the motor shaft 12 and extend in parallel to it. The feet 54 adjoin the sides of the motor case 20 and are at a higher level than the bottom of the circumference. The back surfaces of the feet 54 form attachment faces $S_1$ and $S_2$ for contact with bonding patterns (not shown) on the board. The feet 54 have projections 54a extending from the legs 52 to the eccentric weight 3 side. The projecting ends of the projections 54a are positioned further to the eccentric weight 3 side than the center of gravity W of the vibration motor 1 itself as shown in FIG. 4B. The leg connecting part 56 of the attachment frame 50 forms a flat plate having a recess 56a in which a male part 32 of the end cap 30 fits in the sliding direction. The end cap 30 has a positioning spacer 32a projecting out from the end 32 to be inserted filling the space from the back surface of the leg connecting part 56 to the circumference surface of the motor case 20.

Here, as shown in FIG. 7, the plane S including the back surfaces (attachment faces $S_1$ and $S_2$) of the pair of feet 54 is positioned slightly above the level of the motor shaft 12 (center O of rotation), so intersects the circular orbit C of the outermost point of the eccentric weight 3 at two points $P_1$ and $P_2$. Further, the distance h between the center point Q of the line L connecting these two points ($P_1$ and $P_2$) and the point R where a diametrical line d of the circular orbit C passing through this point Q intersects the circular orbit C in the normal direction N of the back surfaces (attachment faces $S_1$ and $S_2$) is at least the radius r of the circular orbit C and not more than the sum of the radius r and the thickness of the board 5.

The end cap 30, as shown in FIG. 6B, has a pair of relay terminals 33 conductively connected to the brush pair 31 and sticking out to the back side. Each external connection terminal 40 has the projecting part of a relay terminal 33 and a positioning projection 34 of the back side of the end cap 30 inserted into it. The pair of external connection terminals 40 are symmetrical left-right in shape. The external connection terminals 40 have bent parts 42 sticking outward from the side edges of the end cap 30 and bent toward the sides of the end cap 30. The back surfaces of these bent parts 42 form electrode faces for connection with power feed patterns (not shown) on the board as supplementary attachment faces $V_1$ and $V_2$. Further, the back surfaces of the pair of bent parts 42 are in the same plane as the plane S in the direction of extension of the back surfaces (attachment faces $S_1$ and $S_2$) of the pair of feet 54.

When mounting such a vibration motor 1 to a board, as shown in FIG. 1, a board 5 provided with a cutaway space 5a of an elongated rectangular shape enabling the motor body 2 to sink into it is used. That is, the back surfaces of the feet 54 and the bent parts 42 are placed on one surface of the board at the patterns (not shown) formed at the sides of the cutaway space 5a and fixed there by solder etc. so that the motor body 2 is sunken or suspended in the cutaway space 5a in posture. The eccentric weight 3 is positioned at the outer side from one side edge of the board 5. Therefore, the vibration motor 1 mounted not on one surface of the board 5, but utilizing the thickness parts of the board 5, so the height by which the vibration motor 1 projects out from one surface of the board 5 can be reduced and the mounting board can be made thinner. Further, in the case of two surface mounting, the effect of reduction in thickness becomes further greater.

It is possible to arrange the eccentric weight 3 utilizing the space outside the side edge of the board 5 (clearance between board side edge and board case etc.), so it is possible to reduce the actual area occupied on the board 5 (area of cutaway space 5a). Further, a greater size of the eccentric weight 3 can also be realized.

In this embodiment, the external connection terminals 40 have bent parts 42. Their back surfaces also form supplementary attachment faces $V_1$ and $V_2$. In the case of surface mounting by reflow soldering, a bonding force is applied to the board 5 even at the side opposite to the eccentric weight 3 of the motor body 2, so positional deviation can be prevented.

Further, since the projections 54a have gripping actions, even if the eccentric weight 3 is heavy, the problem of the motor itself ending up falling over to the eccentric weight 3 side when placing the vibration motor 1 on the board can be prevented.

Further, since the attachment frame 50 is attached utilizing the end cap 30, no special fastener etc. is required. The leg connecting part 56 of the attachment frame 50 has a recess 56a into which the male part 32 of the end cap 30 fits in the sliding direction. The end cap 30 has a positioning spacer 32a for insertion at the space from the back surface of the leg connecting part 56 to the circumferential surface of the motor case 20. The positioning spacer 32a enables the motor shaft 12 and the legs 54 to be kept in parallel with a high precision and can prevent interference between the eccentric weight 3 and the edges of the board 5.

Further, since the top surface of the leg connecting part 56 is a flat surface, the leg connecting part 56 can be picked up by a suction pad, so a mechanical mounting operation becomes possible.

Second Embodiment

Figure 8:
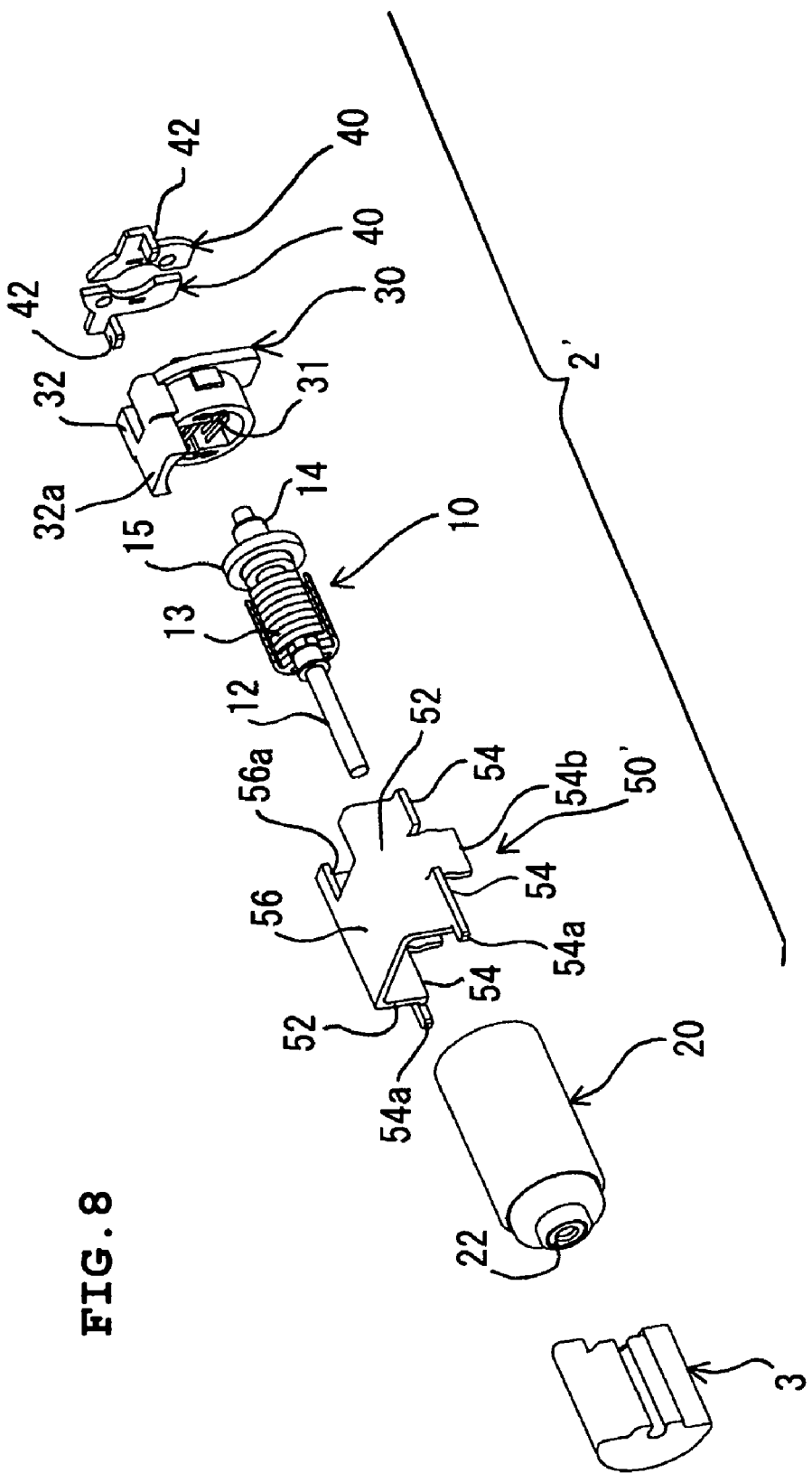
FIG. 8 is an exploded perspective view of a vibration motor according to a second embodiment of the present invention.
Figure 9:
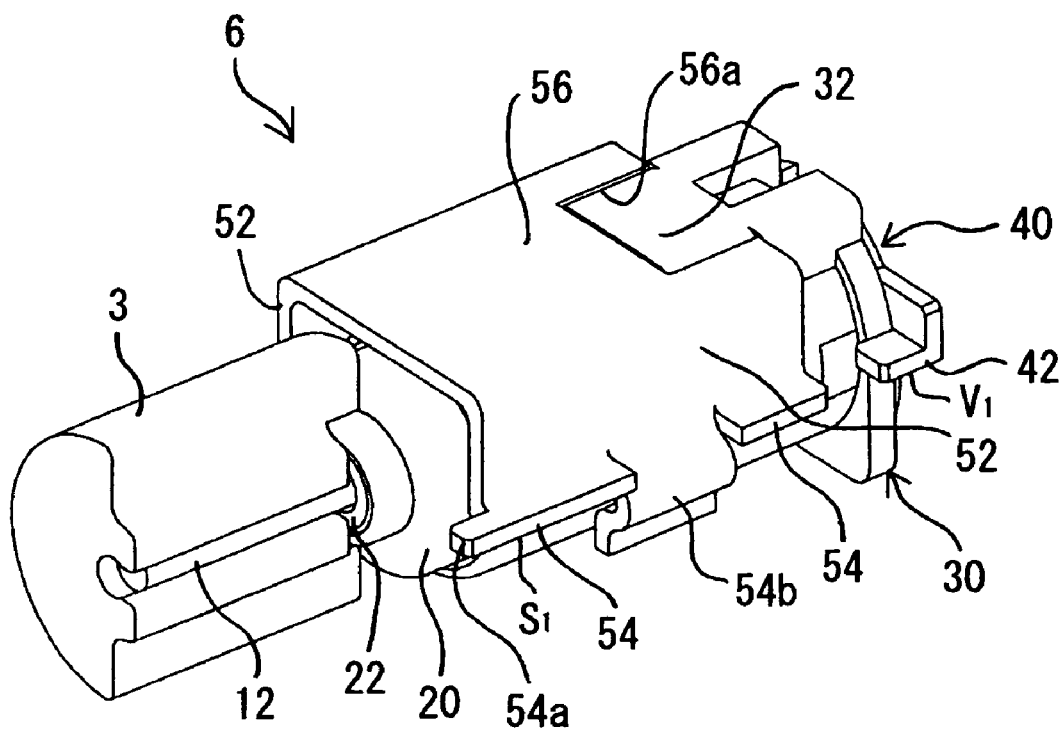
FIG. 9 is a perspective view of a vibration motor and a board for mounting the same.
Figure 10:
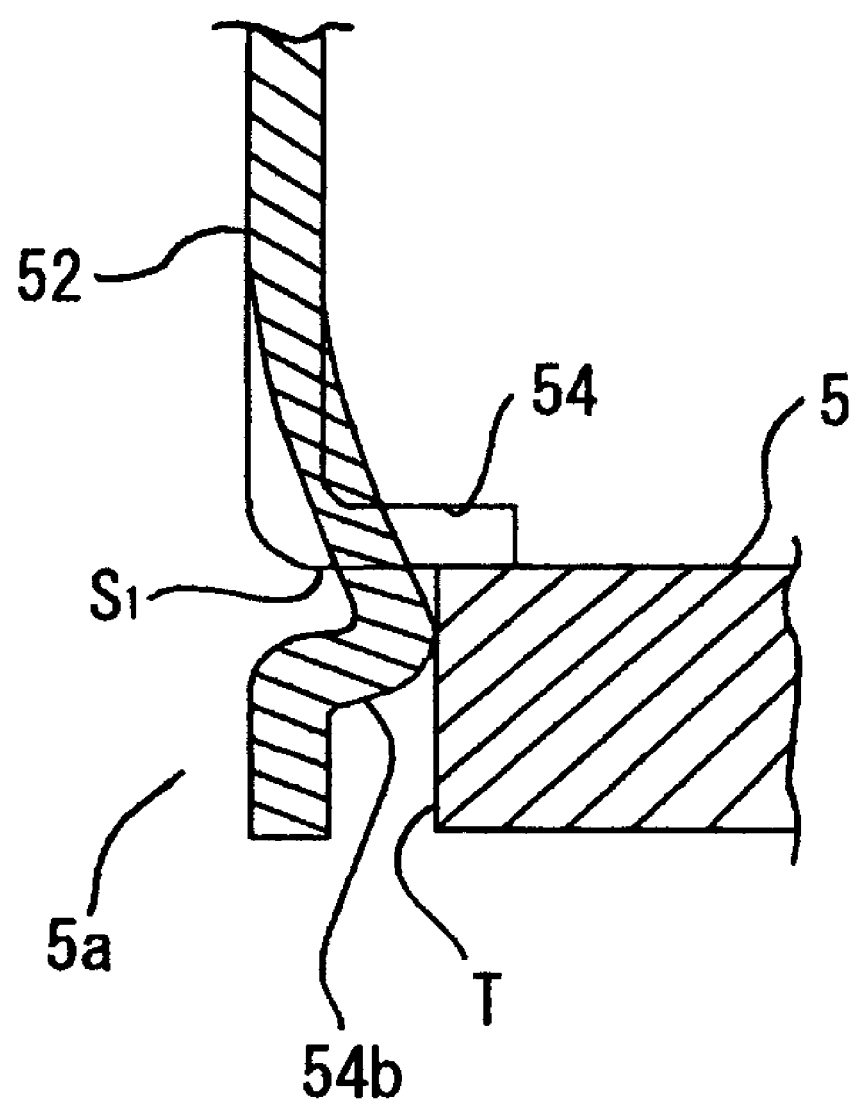
FIG. 10 is a partial cross-sectional view of the state of engagement of an engagement piece of the vibration motor and the surface of the board.

FIG. 8 is an exploded perspective view of a vibration motor according to a second embodiment of the present invention, FIG. 9 is a perspective view showing the vibration motor and the board mounting the same, and FIG. 10 is a partial cross-sectional view of the state of engagement of an engagement piece of the vibration motor and a thickness face of the board. Note that, for parts in FIG. 8 to FIG. 10, the same parts as parts shown in FIG. 1 to FIG. 7 are assigned the same reference notations and explanations thereof are omitted.

The point of different from the first embodiment in the vibration motor 6 of this embodiment is that the legs 54 of the attachment frame 50' have engagement projections 54b which stick out downward from the substantially center positions and elastically press against the thickness faces T of the cutaway space 5a. The engagement projections 54b have curved elastic parts (so-called "kinks") which bulge out outward. The engagement projections 54b divide the feet 54 into two locations.

If the back surfaces of the pair of left and right feet 54 are placed on one surface of the board 5 at the sides of the cutaway space 5a, the engagement projections 54b elastically enter into the cutaway space 5a and elastically press against the thickness faces T in the cutaway space 5a, so a gripping action operates and the vibration motor 6 can be prevented from falling over. Further, positional deviation can be prevented at the time of transport of the mounting board etc. In addition, the attachment area can be reduced, so the amount of use of the cream solder can also be reduced. The engagement projections 54b serving as the engaging means are integral with the attachment frame 50', so no increase in the number of parts is induced and the positioning functions of the feet 54 are realized, so initial positional deviation can also be eliminated.

Third Embodiment

Figure 11:
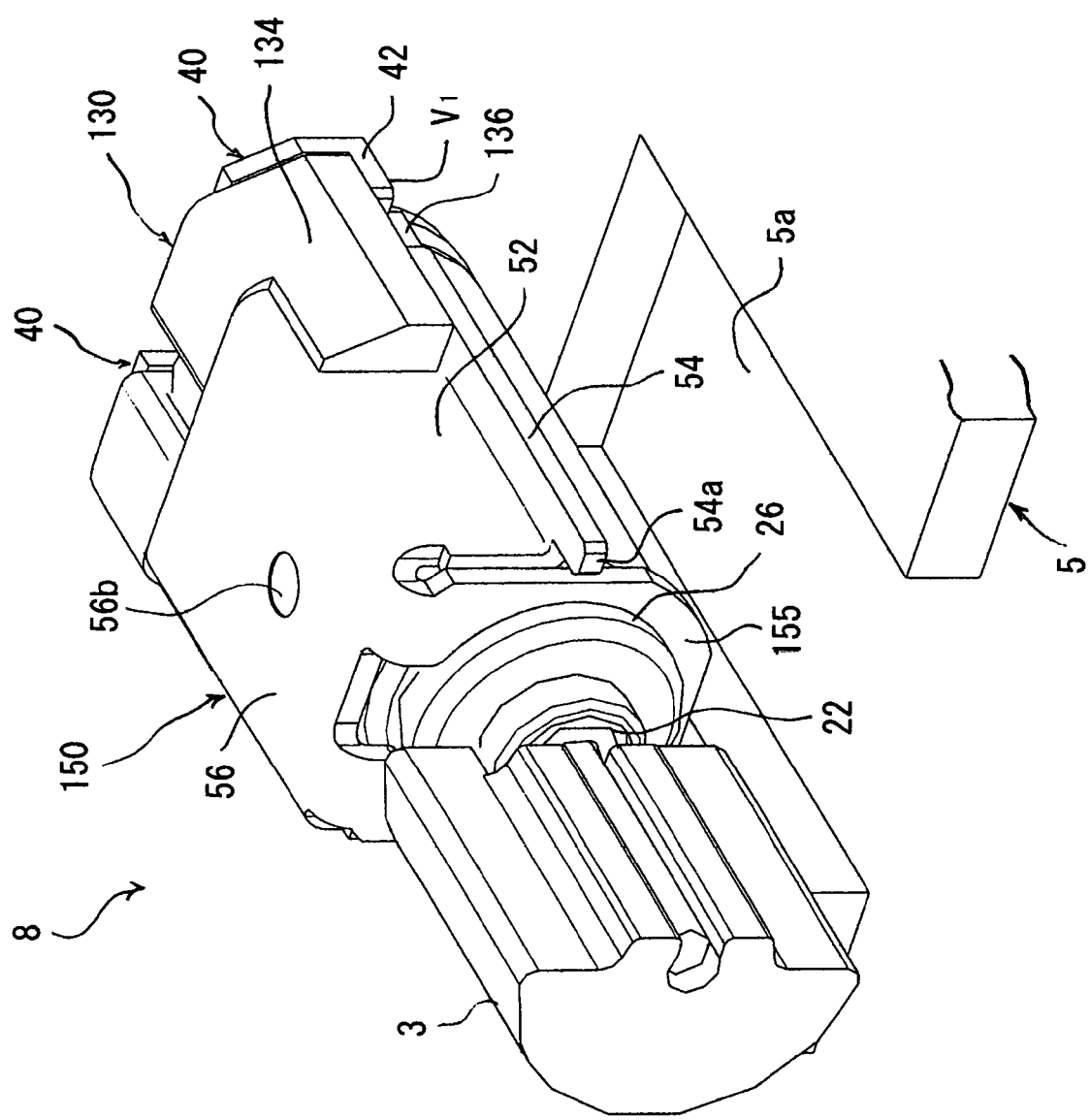
FIG. 11 is a perspective view of a vibration motor according to a third embodiment of the present invention and a board for mounting the same.
Figure 13A:
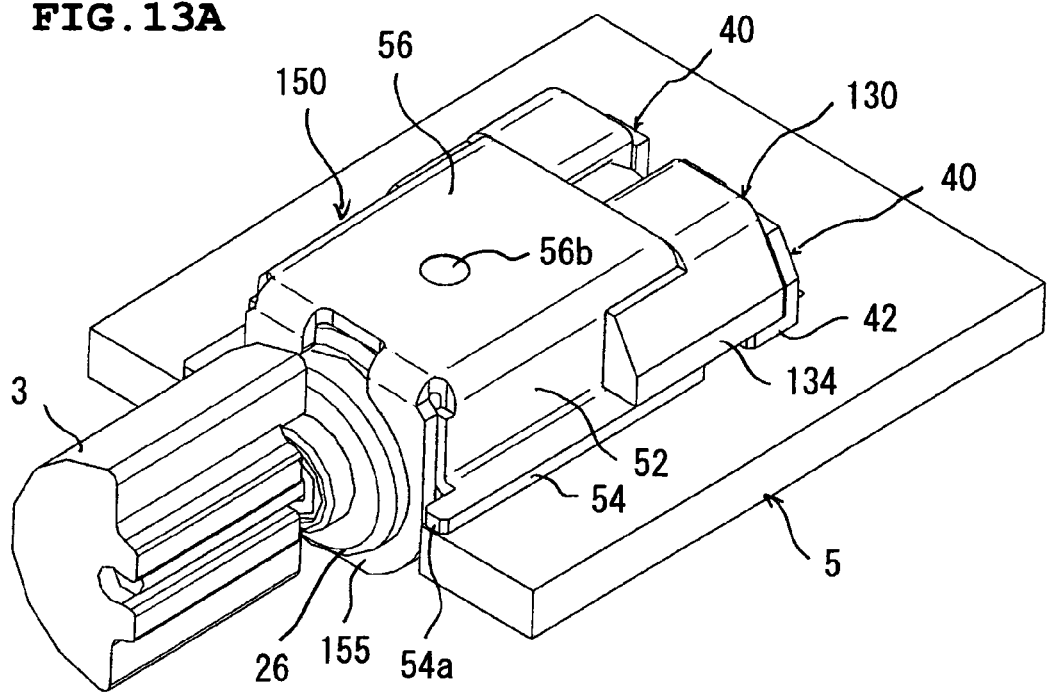
Figure 13B:
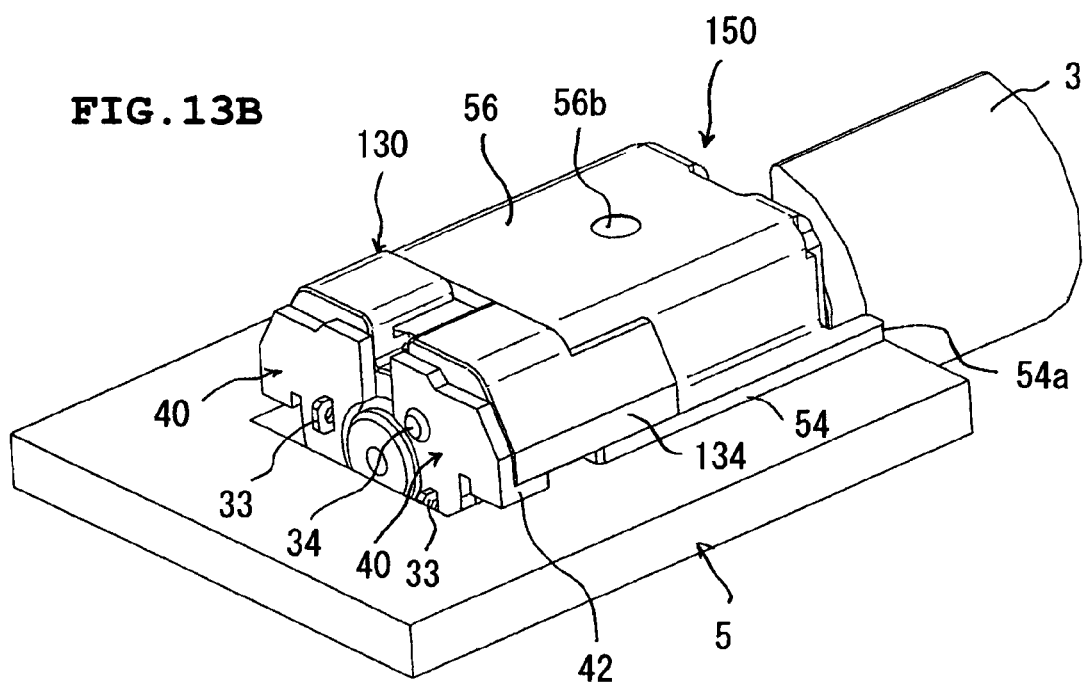
FIG. 13B is a perspective view of the state of mounting of the vibration motor on a board as seen from the side opposite to the eccentric weight.
Figure 14:
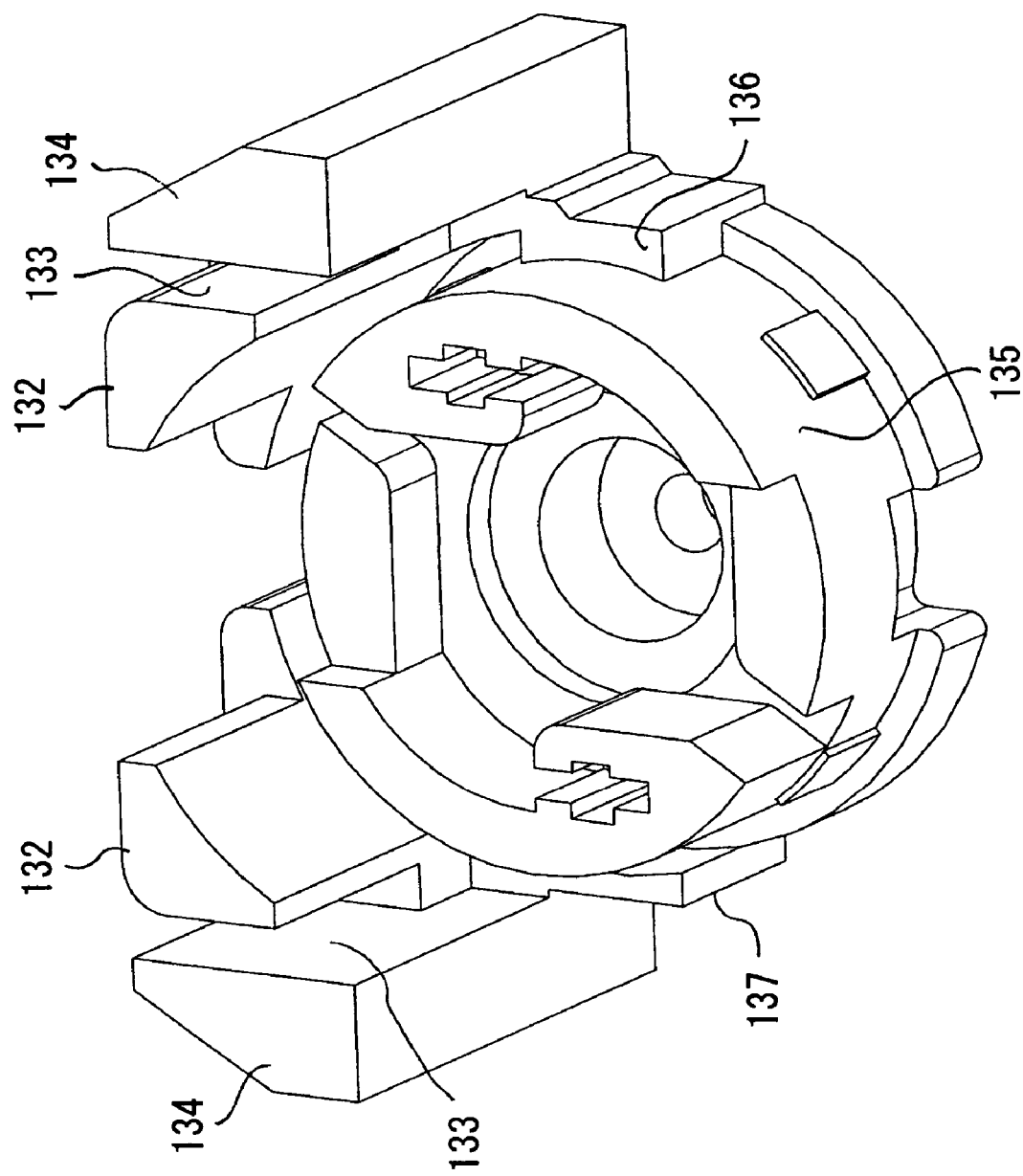
FIG. 14 is a perspective view of an end cap in the vibration motor.
Figure 15A:
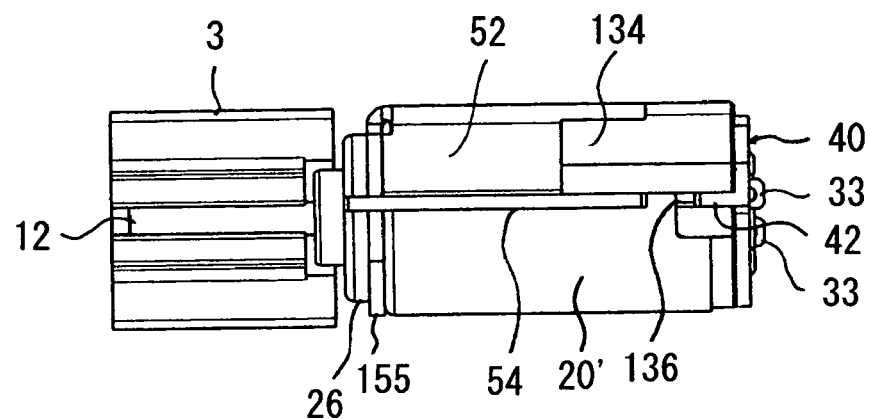
FIG. 15A is a front view of the vibration motor.
Figure 15B:
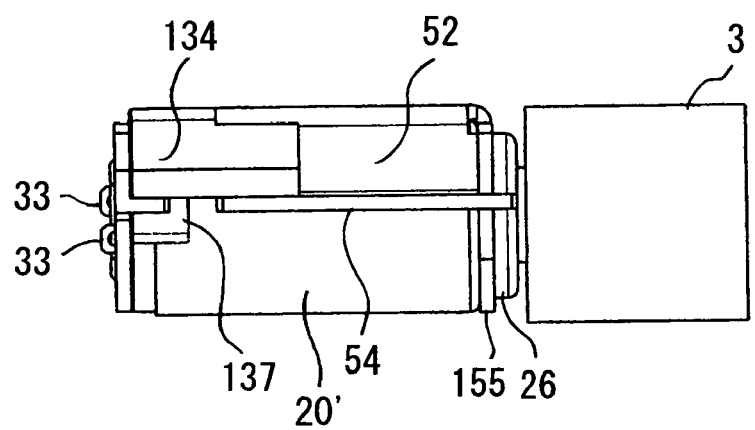
FIG. 15B is a back view of the vibration motor.
Figure 15C:
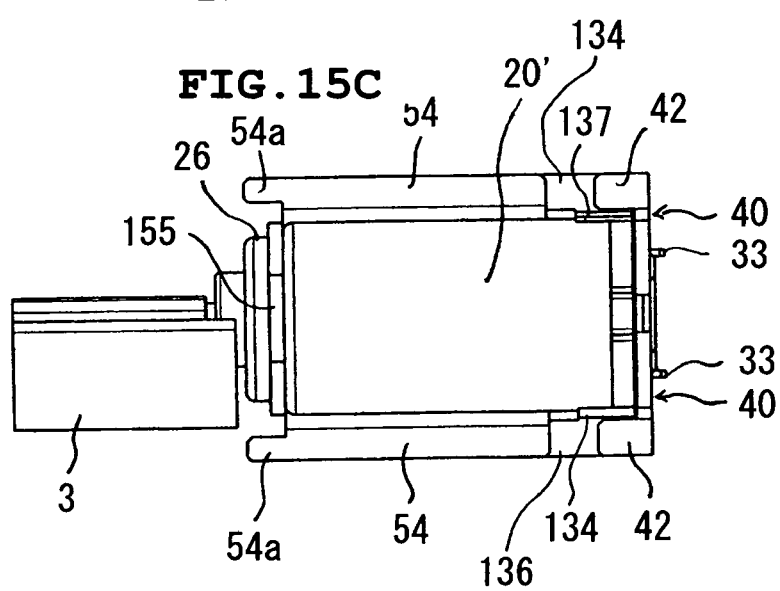
FIG. 15C is a bottom view of the vibration motor.

FIG. 11 is a perspective view of a vibration motor according to a third embodiment of the present invention and a board for mounting the same; FIG. 12 is an assembled perspective view of the vibration motor; FIG. 13A is a perspective view of the state of mounting of the vibration motor on a board as seen from the eccentric weight side, while FIG. 13B is a perspective view of the state of mounting of the vibration motor on a board as seen from the side opposite to the eccentric weight; FIG. 14 is a perspective view of an end cap in the vibration motor; and FIG. 15A is a front view of the vibration motor, FIG. 15B is a back view of the vibration motor, and FIG. 15C is a bottom view of the vibration motor. Note that in FIG. 11 to FIGS. 15A to 15C, parts the same as the parts shown in FIG. 1 to FIG. 7 are assigned the same reference notations and explanations thereof are omitted.

The points of difference from the first embodiment in the vibration motor 8 of this embodiment are the motor case 20' in the motor body 120, attachment frame 150, and end cap 130.

That is, part of the opening edge of the motor case 20' is formed with a notch 24 for stopping rotation of the end cap 130. Further, the leg connecting part 56 of the attachment frame 150 has a recess 56b for spot welding at the center part of the surface. The attachment frame 150 has integrally a collar-like part 155 bent downward substantially perpendicularly from the eccentric weight side of the leg connecting part 56, sandwiched between the projecting pieces 54a, and tightly fit over the neck part 26 of the motor case 20'.

The end cap 130 comprised of the insulating plastic has a tubular part 135 into which a brush pair 31 is loaded and to be inserted into the opening of the motor case 20', but is not provided with the positioning spacer 32a for insertion into the space between the leg connecting part 56 and circumference of the motor case 20 such as in the first embodiment. Therefore, in this embodiment, it is possible to closely attach the circumference of the motor case 20' and the leg connection part 56, then spot weld at the recess 56b, so the assembly of the motor case 20' and the attachment frame 150 becomes sturdier.

Instead of the positioning spacer 32a of the first embodiment, the end cap 130 has a pair of positioning spacers 132 for insertion into the space between the outer circumference of the motor case 20 and the pair of inner corner parts of the attachment frame 150. Further, the end cap 130 has a pair of pressing parts 134 for insertion along the outside bending lines of the legs 53 and feet 54. Each pressing part 134 is formed integrally with the outside of the corresponding positioning spacer 132 across a slit 133 into which an end edge of the attachment frame 150 is inserted. As shown in FIG. 14, at a slit 133 side of the outer circumference of the tubular part 135 fit into the inner circumference of the motor case 20', an engagement part 136 for insertion into a stop recess 23 of the motor case 20' is integrally formed. The engagement part 136 is interposed between the outer circumference of the motor case 20' and one external connection terminal 40, so short-circuits between them can be reliably prevented. Further, at the outer circumference of the tubular part 135 at the opposite side of the engagement part 136, an insulating wall 137 is formed integrally across a space of about the thickness of the opening edge of the motor case 20'. The insulating wall 137 is interposed between the outer circumference of the motor case 20' and the other external connection terminal 40, so short-circuits between them can be reliably prevented.

In the state with the tubular part of the end cap 130 press-fit in the open side of the motor case 20', the recess 24 and the engagement part 136 fit into each other, whereby the motor case 20' is stopped from rotating. In the state with the end edges of the attachment frame 150 inserted into the slits 133, 133 of the end cap 130, a pair of positioning spacers 132 are inserted into the space (corners) between the circumference of the motor case 132 and the inner corner parts of the attachment frame 150 and a pair of pressing parts 134 are inserted along the outside bending lines between the legs 52 and the feet 54 of the attachment frame 150, so the attachment of the attachment frame 150 and the end cap 130 becomes sturdier and the motor case 20' is fixed clamping the two. Since the positioning spacers 132 are inserted into the inner corner parts as dead spacers, the attachment frame 150 does not need to be high. Further, the positioning spacers 132 and the pressing parts 134 grip the attachment frame 150 and enable positioning of the motor case 20's, so the assembly becomes sturdier. Further, if the recess 56b of the attachment frame 150 is spot welded, the motor case 20' and the attachment frame 150 can be joined together.

Note that the recess 24 for stopping rotation is close to the one leg 52 of the attachment frame 150. The neck part 26 has the collar-like part 155 fit over it. The engagement part 136 and the collar-like part 155 suspend and support the motor case 20', so when sturdily combined, it is possible to forego the spot welding.

Here, if the motor case 20' and the attachment frame 150 are fixed by just spot welding, when the mobile phone or other device including the vibration motor is stopped and impact is given to the vibration motor, since the eccentric weight 3 is considerably heavy, the impact stress is liable to occur at the spot welds causing them to easily break and the vibration motor is liable to drop off the attachment frame 150. In this embodiment, however, since the neck part 26 of the motor case 20' is closely fit in the collar-like part 155 and supported by the attachment frame 150, no impact stress will concentrate at the spot welds, there will be resistance to breakage, and the impact resistance of the vibration motor will be greatly improved.

Note that the legs 54 of the attachment frame 150 of this embodiment may also be provided with the engagement projections 54*b* of the second embodiment.

Note that in the above embodiments, the board 5 was formed with a cutaway space 5*a*, but it is also possible to form an open space and mount the vibration motor as a whole in it in a sunken state. In this case, the mounting board can be made thinner too.

While the invention has been described with reference to specific embodiments chosen for purpose of illustration, it should be apparent that numerous modifications could be made thereto by those skilled in the art without departing from the basic concept and scope of the invention.

The present disclosure relates to subject matter contained in Japanese Patent Application No. 2004-082381, filed on Mar. 22, 2004, and Japanese Patent Application No. 2004-225591, filed on Aug. 2, 2004, the disclosures of which are expressly incorporated herein by reference in its entirety.

The invention claimed is:

1. A vibration motor comprised of a motor body, a motor shaft projecting from the motor body, an eccentric weight attached to the motor shaft, and an attaching means for supporting said motor body in a horizontal prone posture at one surface of a board, wherein
the attaching means has a pair of attachment faces straddling said motor shaft and extending in parallel with the same at the two sides of a motor case and
a plane including said pair of attachment faces intersects with a circular orbit of the outermost point of the eccentric weight at two points.

2. A vibration motor as set forth in claim 1, wherein parts of said pair of attachment faces are positioned closer to said eccentric weight side than a center of gravity of said vibration motor itself.

3. A vibration motor as set forth in claim 1 or 2, wherein said motor body has an engaging means elastically fitting into a cutaway space or open space of said board.

4. A vibration motor as set forth in claim 1, wherein a distance between a center point of a line connecting said two points and a point where a diametrical line of said circular orbit passing through that center point intersects said circular orbit in a normal direction at a plane including said pair of attachment faces is at least the radius of said circular orbit and not more than the sum of said radius and the thickness of said board.

5. A vibration motor as set forth in claim 1, wherein a pair of external connection terminals attached to the side of said motor body opposite to the eccentric weight side have supplementary attachment faces substantially in the same plane as the plane including said pair of attachment faces and in contact with one surface of said board.

6. A vibration motor as set forth in claim 1, wherein:
said motor body has an end cap for closing an opening of said motor case at the side opposite to said eccentric weight and a pair of external connection terminal pieces attached to said end cap,
said attaching means has a pair of legs straddling said motor case in its thickness direction, a leg connecting part connecting said pair of legs on said motor case, and feet formed at the bottom of said legs, and
said attachment faces are the back surfaces of said feet.

7. A vibration motor as set forth in claim 6, wherein said feet are formed by bending the bottom ends of said legs outward.

8. A vibration motor as set forth in claim 6, wherein:
said leg connecting part has a recess with which a male part formed at said end cap fits in a sliding direction, and
said end cap is formed with a positioning spacer to be inserted filling the space from the back surface of said leg connecting part to a circumferential surface of said motor case.

9. A vibration motor as set forth in claim 6, wherein said leg connecting part and the circumference of said motor case are welded together at least in part.

10. A vibration motor as set forth in claim 6, wherein said attaching means is bent from the eccentric weight side of said leg connecting part and formed integrally with a collar part to be fit around a neck part of said motor case.

11. A vibration motor as set forth in claim 6, wherein a recess of said motor case and an engagement part of said end cap are fit together in the state with said end cap press-fit into an opening side of said motor case.

12. A vibration motor as set forth in claim 11, wherein said engagement part is formed interposed between the outer circumference of said motor case and one of external connection terminals.

13. A vibration motor as set forth in claim 12, wherein said end cap has an insulating part interposed between the outer circumference of said motor case and the other external connection terminal in the state with said end cap press-fit into the opening side of said motor case.

14. A vibration motor as set forth in claim 6, wherein positioning spacers of said end cap is inserted to the space between the outer circumference of said motor case and inner corner parts of said attaching means in the state with said end cap press-fit into the opening side of said motor case.

15. A vibration motor as set forth in claim 7, wherein pressing parts of said end cap are inserted along outside bending lines between said legs and said feet of said attaching means in the state with said end cap press-fit into the opening side of said motor case.

16. A vibration motor as set forth in claim 6, wherein said feet are formed with projections projecting further to said eccentric weight side than the position of the center of gravity of said vibration motor itself.

17. A vibration motor as set forth in claim 6, wherein said legs are formed with engaging projections elastically pressing against the side surfaces of the cutaway space or open space of said board.

18. A board mounting structure of a vibration motor comprised of a vibration motor as set forth in claim 1 and a board provided with a cutaway space or an open space, wherein a pair of attachment faces of said vibration motor is affixed to one surface of said board at the sides of said cutaway space or said open space, and said vibration motor is mounted with at least said motor body in a state sunken in said cutaway space or said open space.

* * * * *